United States Patent [19]
Baba et al.

[11] Patent Number: 4,922,524
[45] Date of Patent: May 1, 1990

[54] FACSIMILE SYSTEM WITH A VOICE TRANSMISSION FUNCTION

[75] Inventors: Keizo Baba; Masato Nishikawa, both of Atsugi, Japan

[73] Assignee: Ricoh Company Ltd., Tokyo, Japan

[21] Appl. No.: 196,614

[22] Filed: May 20, 1988

[30] Foreign Application Priority Data
May 20, 1987 [JP] Japan .............................. 62-121402
Mar. 18, 1988 [JP] Japan ................................ 63-63595

[51] Int. Cl.$^5$ ........................................... H04M 11/00
[52] U.S. Cl. ..................................... 379/100; 379/88; 379/93; 379/96; 358/435; 358/440
[58] Field of Search ...................... 379/88, 89, 93, 96, 379/97, 98, 100; 358/257, 402, 435, 438, 440

[56] References Cited
U.S. PATENT DOCUMENTS
4,652,700 3/1987 Matthews et al. .................. 379/100

FOREIGN PATENT DOCUMENTS
59-52864 12/1984 Japan .
0214366 12/1984 Japan ................................... 379/100
0070874 4/1985 Japan ................................... 358/257

Primary Examiner—Jin F. Ng
Assistant Examiner—Wing F. Chan
Attorney, Agent, or Firm—Oblon, Spivak, McClelland, Maier & Neustadt

[57] ABSTRACT

A facsimile communication method includes a voice relay mode. In one example, when this voice relay mode has been established, image information is first transmitted from a transmitter to a receiver and then a voice message arbitrarily created by an operator of the transmitter is also transmitted from the transmitter to the receiver, together with a telephone number of an addressee of the image information. Thereafter, the voice message is transmitted from the receiver to a telephone of the addressee having the telephone number to verbally apprise of the addressee of the fact that the image information addressed to the addressee has been transmitted to the receiver.

3 Claims, 4 Drawing Sheets

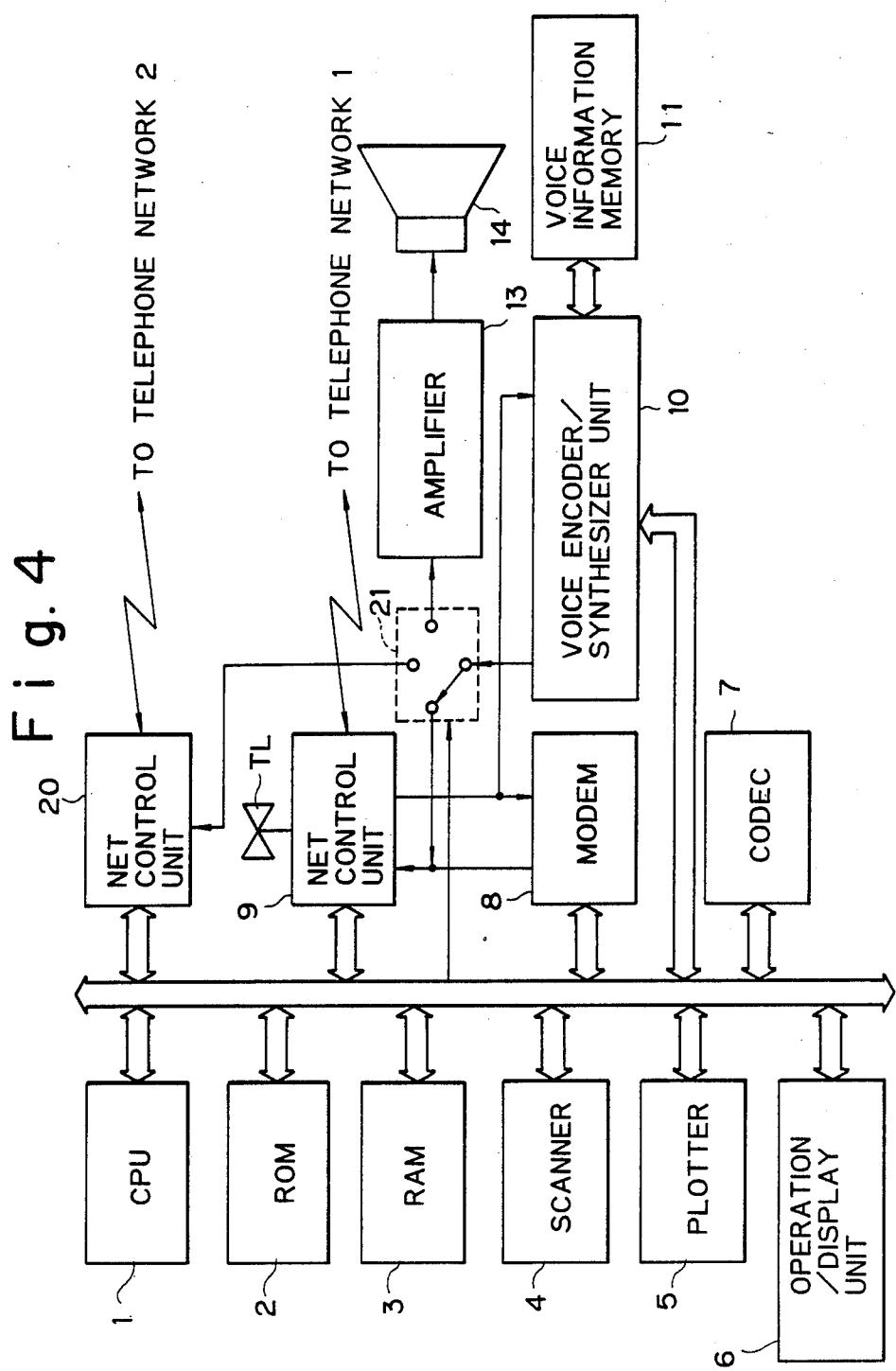

FACSIMILE SYSTEM WITH A VOICE TRANSMISSION FUNCTION

BACKGROUND OF THE INVENTION

1. Field of the Invention

This invention generally relates to a facsimile system and control method and in particular to a facsimile system and control method having a voice transmission function for transmitting voice information from a transmitter to a destination station through a telephone network.

2. Description of the Prior Art

Typically, in a facsimile system, a transmitting facsimile machine transmits image information to a receiving facsimile machine where the image information thus transmitted is recorded on sheets of recording paper which are stacked on a paper tray mounted on the receiving facsimile machine. Since the addressee of the transmitted image information is not always located next to the receiving facsimile machine, the sheets of recording paper on which the transmitted image information has been recorded are left stacked on the paper tray until somebody comes to check the receiving facsimile machine. Thus, the person transmitting the image information must place a telephone call to the addressee to apprise the addressee of the fact that the image information has been transmitted to the receiving facsimile machine. This is cumbersome because one is required to make a telephone call to the addressee of transmitted image information every time when image information has been transmitted. Otherwise, the transmitted image information may go astray or picked up by somebody else or an undesirable person.

Japanese Patent Post-examination Publication No. 59-52864 discloses a facsimile receiver which is provided with a voice message transmitter for transmitting a voice message to the telephone unit of an addressee of transmitted image information such that a pre-recorded fixed voice message indicating the arrival of transmitted information is transmitted. However, in this prior art, the voice message is fixed and pre-recorded in the voice message transmitter of the facsimile receiver so that the contents of the voice message cannot be altered. For example, the person transmitting image information may also wish to transmit additional information verbally depending on the contents of image information to be transmitted, and the invention described in the above-described patent publication cannot cope with such a situation.

SUMMARY OF THE INVENTION

In accordance with the present invention, there is provided a facsimile system which allows to transmit not only image information between a transmitter facsimile machine and a receiver facsimile machine but also a voice message therebetween. The voice message is transmitted from the transmitter facsimile machine to the receiver facsimile machine through a telephone network either before or after transmission of image information and, in one embodiment, it is further transmitted to the telephone unit of an addressee of the image information thus transmitted. Thus, even if the addressee of the transmitted image information is located in a room different from the room in which the receiver facsimile machine is installed, the addressee of the transmitted image information can know that the image information will be or has been transmitted to the receiving facsimile machine. If the receiving facsimile machine is provided with a telephone unit or a loudspeaker, the addressee of the transmitted image information may receive the transmitted voice message through such an audio equipment. In such manner, in accordance with the present invention, a voice message can be transmitted from a transmitting facsimile machine to a receiving facsimile machine through a telephone network, the contents of the voice message may be varied, for example, in accordance with the contents of the image information to be transmitted.

It is therefore a primary object of the present invention to obviate the disadvantages of the prior art as described above and to provide an improved facsimile system and control method.

Another object of the present invention is to provide an improved facsimile system which allows to ease the transmission operation and to cut down a communication cost.

A further object of the present invention is to provide an improved facsimile system capable of transmitting a voice message prior to or after the transmission of image information.

A still further object of the present invention is to provide an improved facsimile system and method capable of insuring that the addressee of transmitted image information will receive the transmitted image information promptly without fail.

A still further object of the present invention is to provide an improved facsimile machine capable of transmitting a voice message prior to or subsequent to transmission of image information to a receiver.

A still further object of the present invention is to provide an improved facsimile machine capable of receiving a voice message, telephone number information for transmitting the voice message, as well as image information and automatically transmitting the voice message thus received to a telephone unit having the telephone number.

Other objects, advantages and novel features of the present invention will become apparent from the following detailed description of the invention when considered in conjunction with the accompanying drawings.

BRIEF DESCRIPTION OF THE DRAWINGS

FIG. 4 is a block diagram showing a facsimile machine constructed in accordance with another embodiment of the present invention.

DESCRIPTION OF THE PREFERRED EMBODIMENTS

Figure 1:
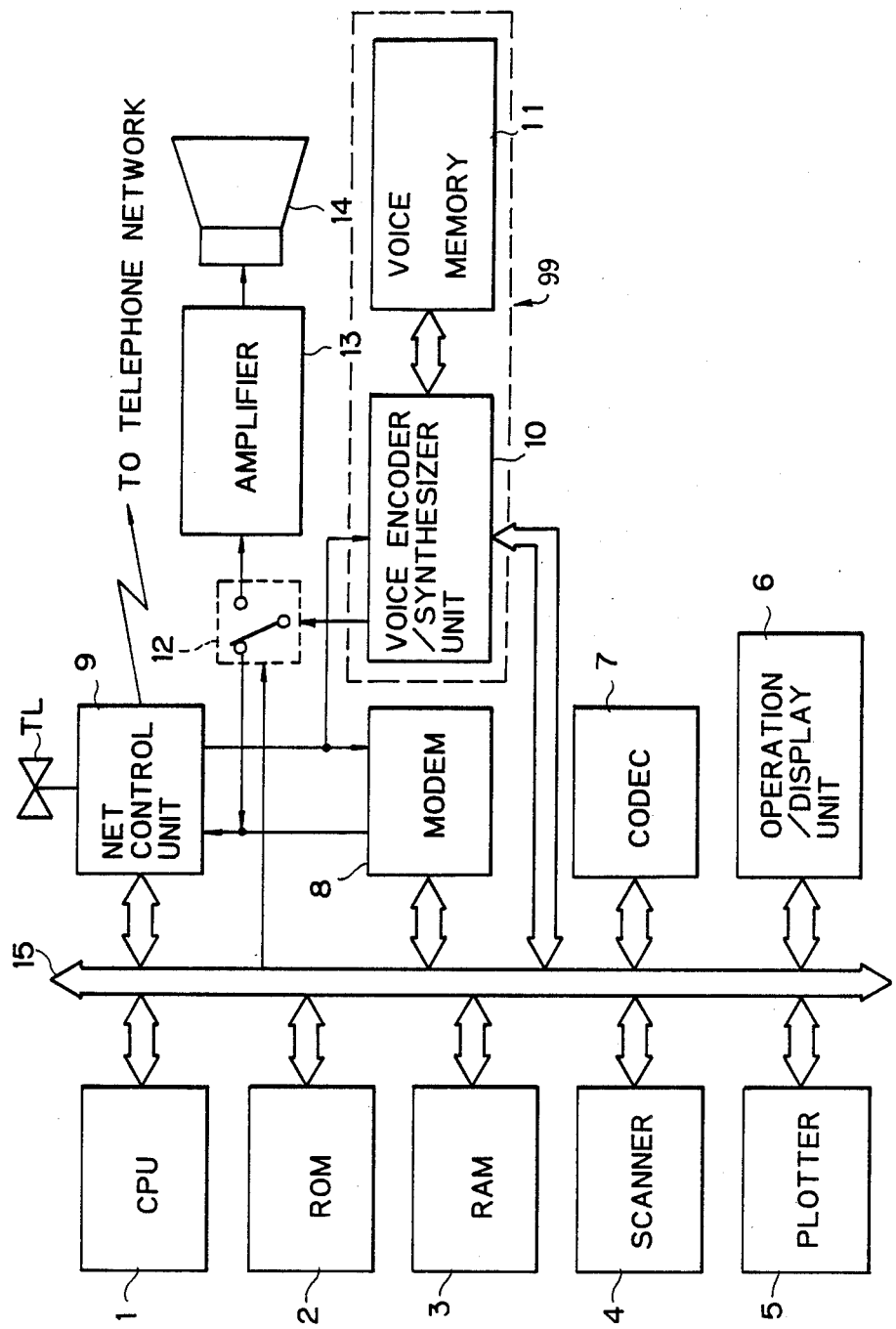
FIG. 1 is a block diagram showing a facsimile machine constructed in accordance with one embodiment of the present invention.

Referring now to FIG. 1, there is shown in block form a facsimile machine constructed in accordance with one embodiment of the present invention. As shown, the present facsimile machine includes a central processing unit or simply CPU 1 in charge of an internal process, a communication control procedure process and a control process of various elements. Programs for these processes are stored in a read only memory or simply ROM 2 and a work area is defined in a random access memory or simply RAM 3. The present facsimile machine also includes a scanner 4 for optically reading an original image at a predetermined resolution and a plotter 5 for recording an image on a sheet of recording paper at a predetermined resolution. The present facsimile machine further includes an operation/display unit 6 which is provided with various keys and display devices and through which various operational commands for operating the present facsimile machine may be input. Also provided in the present facsimile machine is a codec 7 which compresses an image signal by coding and decompresses a compressed image signal by decoding to thereby restore the original image signal.

The present facsimile machine also includes a MODEM 8 which modulates an image signal for transmission to a receiver through a telephone network and demodulates a received image signal and a net control unit 9 which serves to establish a connection between the present facsimile machine and the telephone network to which a telephone unit TL is connected. It is to be noted that the net control unit 9 is provided with an automatic call placing and receiving function. Also provided in the present facsimile machine is a voice coding/synthesizing unit 10 which encodes a voice signal received through the telephone network to thereby convert the received voice signal into a digital voice data and synthesizes the corresponding original voice signal from the digital voice data. The present facsimile machine further includes a voice storage means 99 made up of a voice information memory 11 for storing the digital voice data produced by the voice coding/synthesizing unit 10 and also a digital voice data corresponding to a predetermined response message, which, for example, includes a message apprising the operator of a transmitter of the initiation of transmission of a voice signal.

Also provided in the present facsimile machine is a switch 12 for switching an output of the voice coding/synthesizing unit 10 between the net control unit 9 and an amplifier 13. When the switch 12 takes its first state to establish a connection between the voice coding/synthesizing unit 10 and the net control unit 9, a synthesized voice output from the voice coding/synthesizing unit 10 is supplied to the telephone network through the net control unit 9; whereas, when the switch 12 takes its second state to establish a connection between the voice coding/synthesizing unit 10 and the amplifier 13, a synthesized voice output from the voice coding/synthesizing unit 10 is supplied to the amplifier 13 and then to a loudspeaker 14. The CPU 1, ROM 2, RAM 3, scanner 4, plotter 5, operation/display unit 6, codec 7, MODEM 8, net control unit 9 and voice coding/synthesizing unit 10 are all interconnected from one another through a system bus 15.

With the above-described structure, when image information of an original document is to be transmitted using the present facsimile machine, an operator first sets an original document to be transmitted at the scanner 4 in position, inputs a transmission mode and the telephone number of a receiving station at the operation/display unit 6 and depresses a start button (not shown) at the operation/display unit 6 to initiate the transmission of image information. In this case, in order to send a voice message to the addressees of image information, a voice relay mode is selected and one or more telephone numbers of one or more addressees are also input at the operation/display unit 6.

Figure 2:
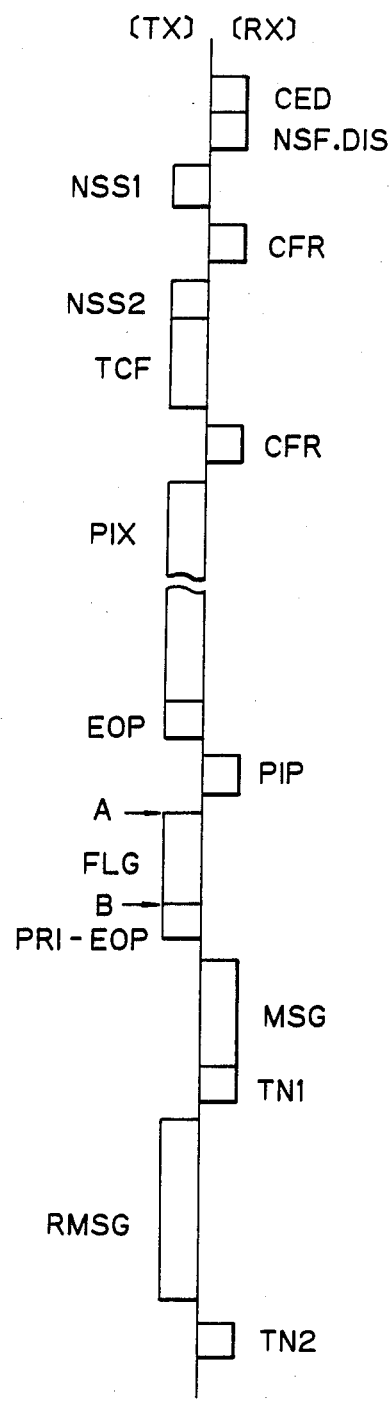
FIG. 2 is a timing chart showing one example of a transmission procedure which may be implemented in the facsimile machine shown in FIG. 1.

As shown in FIG. 2, in the first place, when a transmitter facsimile machine TX places a call to a receiver facsimile machine RX, the receiver facsimile machine RX responds by sending a called station identification signal CED to the transmitter facsimile machine TX. In addition, the receiver RX also sends a non-standard facility signal NSF for indicating the non-standard transmission functions provided in the receiver RX and a digital identification signal DIS for indicating the standard transmission functions provided in the receiver RX to the transmitter TX. Then, the transmitter TX analyzes the non-standard facility signal NSF, and as a result, when the transmitter TX confirms the fact that the receiver RX is provided with a voice relay function, it first indicates to use the voice relay mode and transmits a non-standard facility setting signal NSS1 in which one or more telephone numbers are set to the receiver RX.

Responsive to this non-standard facility setting signal NSS1, the receiver RX sends a reception preparation confirmation signal CFR, which indicates the fact that the voice relay mode has been set, to the transmitter TX. Then, the transmitter TX transmits a non-standard facility setting signal NSS2 for setting a function to be used in transmission of image information and in succession a training check signal TCF to the receiver RX. When the receiver RX has responded by a reception preparation confirmation signal CFR which indicates the fact that the receiver RX is ready to receive image information, the transmitter TX optically reads the original set at the scanner 4 and an image signal thus obtained is transferred to the MODEM 8 after having been compressed by the codec 7. Accordingly, image information PIX is transmitted from the transmitter TX to the receiver RX.

At the receiver RX, the received image information PIX is restored to its original image signal by the codec 7 and the thus restored image signal is transferred to the plotter 5 where the received image is recorded on a sheet of recording paper. Upon completion of all of the received image information, the transmitter TX transmits a procedure end signal EOP to the receiver RX. In this case, since the voice relay mode has been set, the receiver RX sends a procedure interrupt affirmation signal PIP to the transmitter TX. As a result, the transmitter TX causes the operation/display unit 6 to produce an alarm sound (A) and to display a message, such as "DEPRESS STOP KEY AND PICK UP THE HANDSET", thereby waiting for the operator to depress the stop key, so as to allow the operator to transmit a voice message. In this case, in order to keep the receiver RX in a receiving condition, a flag FLG of a non-modulated carrier signal is transmitted from the transmitter TX to the receiver RX.

When the operator has depressed the stop key (B) while picking up the handset of the telephone unit TL, the transmitter TX transmits a procedure interrupt (EOP) signal PRI-EOP to the receiver RX and then causes the telephone unit TL to be connected to the telephone network. Upon receipt of the procedure interrupt (EOP) signal PRI-EOP, the receiver RX reads a digital voice data corresponding to a response message which apprises the operator of the transmitter TX of the initiation of reception of a voice message from the voice information memory 11 and transfers it to the voice coding/synthesizing unit 10, whereby a voice message reception signal MSG is transmitted from the receiver RX to the transmitter TX. The voice message reception signal MSG may, for example, have such a message as "INPUT A MESSAGE AFTER A TONE SOUND." Following the voice message reception signal MSG, a tone signal TN1, which indicates to the operator of the transmitter TX to initiate inputting of a message, is transmitted to the transmitter TX.

In response to the tone signal TN1, the operator of the transmitter TX inputs a voice message RMSG to an addressee of the image information PIX using the handset of the telephone unit TL and thus the voice message RMSG is transmitted from the transmitter TX to the receiver RX. Upon completion of inputting of the voice message RMSG, the operator of the transmitter TX hangs up the handset so that the handset is set in an on-hook state in the telephone unit TL to thereby complete the entire operation.

On the other hand, at the receiver RX, the voice signal received during a time period from the termination of transmission of the tone signal TN1 to the time when the telephone unit TL of the transmitter TX is set in an on-hook state is converted into a digital voice data by the voice coding/synthesizing unit 10 and the thus converted digital voice data is stored in the voice information memory 11. Upon detection of the on-hook state at the telephone unit TL of the transmitter TX, another tone signal TN2 indicating the completion of recording of the voice message RMSG is transmitted from the receiver RX to the transmitter TX and then the communication line is disconnected.

In this manner, upon completion of transmission of image information from the transmitter TX to the receiver RX, the receiver RX selects one of the telephone numbers of destination stations to be relayed which have also been received from the transmitter TX and transfers the thus selected telephone number to the net control unit 9 which in turn places a call to the telephone of a destination station having that selected telephone number. When the destination station, which is also the addressee of the transmitted image information, has received the call and the addressee picked up the handset of the telephone unit, the digital voice data corresponding to the voice message RMSG from the operator of the transmitter TX to the addressee of the transmitted image information is read out of the voice information memory 11 and transferred to the voice coding/synthesizing unit 10, so that the voice message RMSG is reconstructed and transmitted to the telephone unit of the addressee through the telephone network. Accordingly, the addressee receives the voice message of the operator of the transmitter TX by his or her telephone unit which is separate from the telephone unit TL of the receiver RX.

If two or more telephone numbers have been designated as the addressees of the image information, the voice message RMSG is sent to all of the addressees in a similar manner as described above. On the other hand, if no telephone number of an addressee has been designated, the receiver RX forms a report of predetermined format, indicating the fact that the voice message of the operator of the transmitter TX is stored, which is then recorded on a sheet of recording paper by the plotter 5. In this case, when the operator of the receiver RX notices this report, he or she operates the operation/display unit 6 to cause the stored voice message to be reproduced. That is, under the control of the CPU 1 of the receiver RX, with the amplifier 13 connected to the voice coding/synthesizing unit 10 through the switch 12, the digital voice data corresponding to the voice message RMSG is read out of the voice information memory 11 and transferred to the voice coding/synthesizing unit 10. As a result, the voice message RMSG from the operator of the transmitter TX to the addressee of the image information PIX is output from the loudspeaker 14 as audio information.

As described above, in accordance with the present embodiment, when the voice relay mode is set, any voice message, e.g., indicating the transmission of image information PIX, can be automatically transmitted from the receiver RX to a telephone unit having the telephone number of the addressee of the image information PIX so that it is not necessary for the operator of the transmitter TX to call the addressee of the image information PIX to apprise the addressee of the fact that the image information PIX has been transmitted to the receiver RX. Besides, it is not necessary for the operator of the receiver RX to call the addressee to tell the addressee of the arrival of the image information PIX.

In the above-described embodiment, the voice message RMSG of the operator of the transmitter TX is transmitted after transmission of the image information PIX from the transmitter TX to the receiver RX. As an alternative embodiment, the transmission of the voice message RMSG may be carried out prior to the transmission of the image information PIX, an example of transmission procedure of which is illustrated in FIG. 3.

Figure 3:
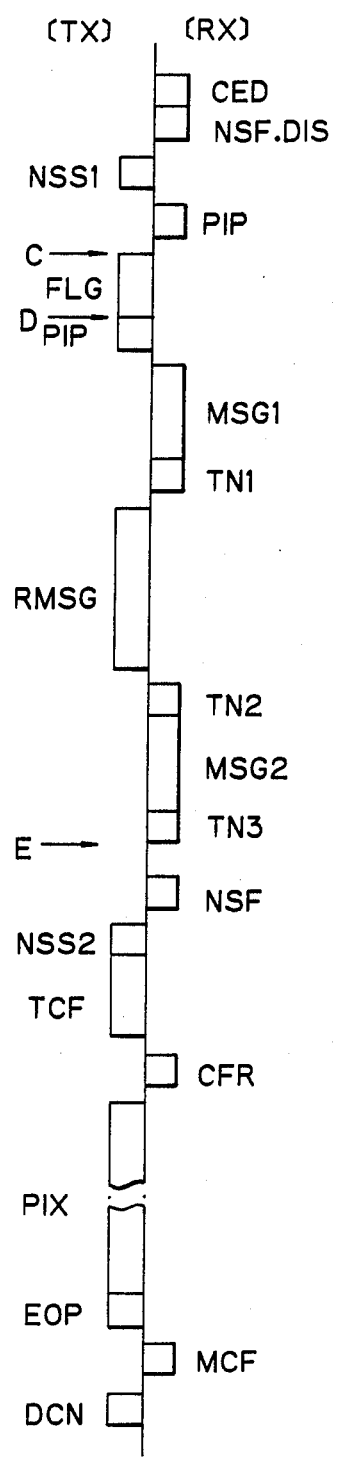
FIG. 3 is a timing chart showing another example of a transmission procedure which may also be carried out in the facsimile machine shown in FIG. 1.

In the alternative embodiment of FIG. 3, similarly with the previous embodiment, when the transmitter TX confirms the fact that the non-standard facility signal NSF received from the receiver RX includes the voice relay function, the transmitter TX indicates to use the voice relay mode and then transmits a non-standard facility setting signal NSS1, in which one or more telephone numbers designated by the operator of the transmitter TX for relaying image information thereto, to the receiver RX. In response thereto, the receiver RX transmits a procedure interrupt affirmation signal PIP to the transmitter TX to request the transmitter TX to set ready for transmission of a voice message. Thus, the transmitter TX produces an alarm sound (C) at the operation/display unit 6 so as to instigate the operator of the transmitter TX to input a voice message, displays a visual message, such as "DEPRESS STOP KEY AND PICK UP THE HANDSET", at the operation/display unit 6 and wait for the operator to depress the stop key. In this case, a flag FLG of non-modulated carrier signal is transmitted from the transmitter TX to the receiver RX so as to keep the receiver RX in a receiving condition.

When the operator picks up the handset of the telephone unit TL and depresses the stop key (D), the transmitter TX transmits a procedure interrupt affirmation signal PIP to the receiver RX and then causes its telephone unit TL to be connected to the telephone network. At the receiver RX, upon receipt of the procedure interrupt affirmation signal PIP, a digital voice data corresponding to a response message, which apprises the operator of the transmitter TX to initiate inputting of a voice message, is read out of the voice information memory 11 and transferred to the voice coding/synthesizing unit 10, so that a reception ready message MSG1 is transmitted from the receiver RX to the transmitter TX. Following the reception ready message MSG1, a tone signal TN1 indicating the operator of the transmitter TX to start to input a voice message is transmitted from the receiver RX to the transmitter TX. The reception ready signal MSG1 is identical in contents to the above-described reception ready signal MSG.

In response to the tone signal TN1, the operator of the transmitter TX inputs any desired voice message RMSG to an addressee of image information to be transmitted using the handset of the telephone unit TL. On the other hand, at the receiver RX, upon completion of transmission of the tone signal TN1, a voice message RMSG received from the transmitter TX is converted into a digital voice data by the voice coding/synthesizing unit 10 and the digital voice data thus converted is stored into the voice information memory 11. The receiver RX monitors whether or not the voice coding/synthesizing unit 10 has detected a voiceless period over a predetermined time period, e.g., one second. If the voice coding/synthesizing unit 10 of the transmitter TX has detected the presence of a voiceless period over a predetermined time period after the completion of inputting of a voice message RMSG by the operator of the transmitter TX, the conversion operation of the voice coding/synthesizing unit 10 is terminated.

Then the receiver RX outputs another tone signal TN2 indicating the completion of recording of the voice message RMSG and then reads out a digital voice data of transmission resumption message MSG2 from the voice information memory 11 and transfers it to the voice coding/synthesizing unit 10. As a result, the transmission resumption message MSG2, for example, of "AT THE NEXT TONE SIGNAL, DEPRESS THE START KEY AND HANG UP THE HANDSET" is transmitted from the receiver RX to the transmitter TX. In addition, following the transmission resumption message MSG2, a further tone signal TN3 is transmitted from the receiver RX to the transmitter TX. Then, at a point in time after elapsing a predetermined time period subsequent to the tone signal TN3, a non-standard facility signal NSF for transmitting image information is transmitted from the receiver RX to the transmitter TX. In accordance with the instructions of the transmission resumption message MSG2, the operator of the transmitter TX depresses the start key upon hearing the tone signal TN3 (E).

Then the transmitter TX causes its MODEM 8 to be connected to the telephone network and resumes a communication procedure for transmission of image information, and upon receipt of the non-standard facility signal NSF from the receiver RX, the transmitter TX transmits a non-standard facility setting signal NSS2 for setting the transmission function to be used for transmission of image information and in succession a training check signal TCF at the MODEM speed set thereby. When the receiver RX responds by outputting a reception preparation confirmation signal CFR, which indicates the fact that it is ready to receive image information, the transmitter TX transmits image information PIX to the receiver RX in a manner similar to that described with respect to the above-described embodiment.

At the receiver RX, the image information PIX thus received is restored to its original image signal by the codec 7, which is then transferred to the plotter 5 to have the received image information recorded on a sheet of recording paper. Upon completion of transmission of all of the image information PIX, the transmitter TX transmits a procedure end signal EOP to the receiver RX, and when the receiver RX has received the image information PIX without problem, the receiver RX sends a message confirmation signal MCF indicating the normal reception of the image information PIX to the transmitter TX. In response thereto, the transmitter TX outputs a network disconnection command signal DCN to have the transmitter TX disconnected from the network and terminates the image information transmission process.

Upon receipt of the network disconnection command signal DCN, the receiver RX is once disconnected from the network, and then, similarly with the previously described embodiment, the voice message RMSG stored in the voice information memory 11 is transferred to a designated destination, i.e., the addressee of the transmitted image information PIX.

As described above, in accordance with the present embodiment, since the voice message of the operator of the transmitter TX is transmitted from the transmitter TX to the receiver RX prior to the transmission of image information from the transmitter TX to the receiver RX, the operator of the transmitter TX may move away from the transmitter TX after inputting his or her voice message, and thus the time period during which the operator is required to attend to the transmitter TX at the time of transmission of image information is shortened.

In the present embodiment, the termination of voice message RMSG of the operator of the transmitter TX is determined when the voice coding/synthesizing unit 10 has detected the presence of a voiceless interval over a predetermined time period; however, such a determination may be made by any other means. For example, it may also be so structured to have the operator of the transmitter TX depress an end key upon completion of inputting of a voice message, which causes a special tone signal to be transmitted to the receiver RX, whereby the receiver RX determines the termination of voice message RMSG upon receipt of this special tone signal. As a further alternative example, the time period for voice message RMSG may be set at a fixed amount, in which the second tone signal TN2 is output after elapsing a predetermined time period after the first tone signal TN1, and the second tone signal TN2 is transmitted to the transmitter TX as an end signal of voice message RMSG.

In each of the above-described embodiments, the received voice message RMSG is transferred to its destination, i.e., addressee of image information PIX upon completion of transmission of image information PIX. Alternatively, it may also be so structured to transmit both of image information PIX and voice message RMSG at the same time or in parallel. FIG. 4 illustrates an embodiment which allows to transmit both of image information PIX and voice message RMSG in parallel. It is to be noted that those elements of the structure shown in FIG. 4 which are similar to those elements shown in FIG. 1 are indicated by similar numerals.

In the embodiment shown in FIG. 4, another net control unit 20 having an automatic call placing and receiving function is additionally provided, so that a facsimile machine of FIG. 4 is connectable to two telephone transmission lines. The present facsimile machine includes a switch 21 which may establish a connection between the voice coding/synthesizing unit 10 and one of the first net control unit 9, amplifier 13 and second net control unit 20 selectively. The switch 21 is controlled to normally establish a connection between the voice coding/synthesizing unit 10 and the first net control unit 9 under control of CPU 1. In the present embodiment, similarly with the transmission procedure shown in FIG. 3, a voice message of the operator of the transmitter TX is transmitted prior to the transmission of image information, and simultaneously with the transmission of image information, the voice message RMSG stored in the voice information memory 11 is transmitted to a destination station, i.e., addressee of the image information. That is, a transmission procedure is implemented in a manner similar to that of the previous embodiment, and when the transmission of image information is resumed upon completion of transmission of the voice message of the operator of the transmitter TX, the receiver RX resumes the procedure of transmission of image information similarly as above, whereby the synthesized voice output terminal of the voice coding/-synthesizing unit 10 is operatively coupled to the transmission signal input terminal of the net control unit 20 by the switch 21.

Then one of the designated addressees is selected and a call is placed to the thus selected addressee by the second net control unit 20. When the addressee picks up the handset of his or her telephone unit to which a call has been placed from the receiver RX, the digital voice data of the received voice message RMSG is read out of the voice information memory 11 and transferred to the voice coding/synthesizing unit 10 so that the voice message RMSG is transmitted to the addressee. Upon completion of the transmission of the voice signal RSMG to the addressee, the addressee hangs up the handset so that the second net control unit 20 restores its connected network. If two or more addressees have been designated, the similar operation is repetitively carried out until the voice message RMSG has been transmitted to all of the designated addressees. As described above, in the present embodiment, since the transmission of image information PIX from the transmitter TX to the receiver RX and also the transmission of voice message RMSG from the receiver RX to a designated addressee are carried out in parallel, the overall operation can be carried out in a short period of time. Besides, if the addressee is in the same building or room in which the present facsimile machine is installed, the addressee may come to the facsimile machine while the image information PIX is being transmitted so that the addressee may acquire the image information without delay.

In the voice relay mode of each of the above-described embodiments, the contents of voice message RMSG may be determined arbitrarily by the operator of the transmitter TX. For example, the voice message RMSG to be transmitted from the transmitter TX to an addressee via the receiver RX may include voice information indicating the fact that image information PIX has been or is going to be transmitted to the receiver RX and/or voice information regarding the image information PIX which cannot be well expressed by graphics and which can be better expressed verbally. Thus, the contents of voice message RMSG to be transmitted to the addressee of image information PIX from the transmitter TX to the addressee as relayed through the receiver RX may be arbitrarily determined by the operator of the transmitter TX. In each of the above-described embodiments, voice message RMSG from the operator of the transmitter TX is temporarily stored into and read out of the voice information memory 11, which is preferably comprised of a semiconductor memory, from and to the voice coding/synthesizing unit 10; however, as an alternative structure, use may be made of a recording and reproducing device, such as a tape recorder, for temporarily recording and reproducing voice message RMSG. In addition, in the above-described embodiments, provision is made of a loud-speaker for producing an audio sound corresponding to the voice message RMSG at the receiver RX; however, the voice message RMSG may also be heard by a telephone unit.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile communication method, comprising the steps of:
   (a) transmitting a voice message of an operator of a transmitter, together with a telephone number of an individual entity to whom the image information is to be addressed, to a receiver which temporarily stores said voice message and said telephone number;
   (b) transmitting image information from said transmitter to said receiver over the same connection medium as said first transmitting step; and
   (c) transmitting said voice message stored in said receiver to a telephone unit of said individual entity having said stored telephone number during the transmission in step (b) over internal lines.

2. A facsimile machine comprising:
   a telephone unit;
   a first net control unit operatively connected to said telephone unit, said net control unit establishing a connection to a telephone network selectively;
   reading means for optically reading an original to be transmitted;
   storing means operatively coupled to said net control unit made up of a voice coding/synthesizing unit operatively coupled to said net control unit for coding a voice signal into a digital voice data or synthesizing said voice signal from said digital voice data and a voice memory operatively coupled to said voice coding/synthesizing unit for storing said digital voice data;
   controlling means for controlling the overall operation of said facsimile machine;
   an amplifier;
   a loud speaker connected to said amplifier; and
   switching means for switchingly establishing a connection from said voice coding/synthesizing unit between said net control unit and said amplifier, whereby said voice signal, which is stored in said storing means, is transmitted from another facsimile machine through said telephone network or as supplied from said telephone unit and transmitted to another telephone unit through said telephone network, is controlled by said controlling means.

3. The machine of claim 2 further comprising:
   a second net control unit operatively connected to an additional telephone network, whereby said switching means switchingly establishes a connection between said voice coding/synthesizing unit and a selected one of said first and second net control units and said amplifier.

* * * * *